Figure 1:
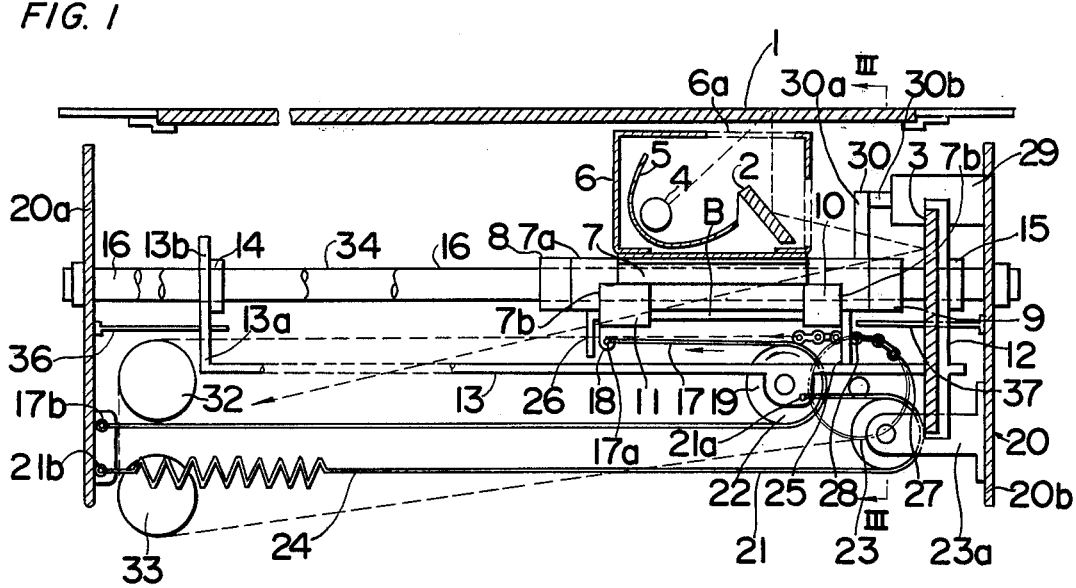

United States Patent [19]

Kurita

[11] 3,877,807
[45] Apr. 15, 1975

[54] IMAGE SCANNING DEVICE IN A PHOTOCOPYING APPARATUS
[75] Inventor: Takaji Kurita, Osaka, Japan
[73] Assignee: Minolta Camera Kabushiki Kaisha, Osaka, Japan
[22] Filed: Mar. 12, 1974
[21] Appl. No.: 450,448

[30] Foreign Application Priority Data
Apr. 17, 1974  Japan.............................. 49-45977

[52] U.S. Cl...................................... 355/66; 355/8
[51] Int. Cl........................................... G03g 15/04
[58] Field of Search............................ 355/8, 65, 66

[56] References Cited
UNITED STATES PATENTS
3,330,181  7/1967  Jakobson............................ 355/66

Primary Examiner—John M. Horan
Attorney, Agent, or Firm—Wenderoth, Lind & Ponack

[57] ABSTRACT

An image scanning device in a photocopying apparatus is disclosed wherein first and second mirrors are each supported in front and rear bearings slidably mounted on common shafts. The front and rear bearings of the first mirror lie between the front and rear bearings of the second mirror, and the distance between the second mirror front and rear bearings is equal to the sum of the distance between the first mirror front and rear bearings and half the distance the first mirror is required to be moved in order to scan the entirety of a document to be copied, whereby shorter guide shafts may be used and a more compact apparatus is obtained.

5 Claims, 5 Drawing Figures

IMAGE SCANNING DEVICE IN A PHOTOCOPYING APPARATUS

The present invention relates to a photocopying apparatus, and more particularly to a photocopying apparatus of a type wherein successive portions of an original document are scanned and images of the successive portions are transmitted by optical means, comprising first and second mirrors, which are moved parallel to the original document, and of which the second mirror is moved at half the speed of the first mirror, onto a photosensitive material which is moved in a horizontal or a vertical plane, the speeds of the mirrors and of the photosensitive material being in definite ratios.

Conventionally, in this type of photocopying apparatus, a document to be copied is illuminated, and image rays therefrom are directed by the first moving mirror to the second moving mirror (which may be a mirror assembly of a pair of mirrors at right-angles, if required), and thence via a fixed lens or other optical means onto the photosensitive material. To prevent blurring of a copy as a result of shaking or oscillation of the mirrors during traversing thereof past a document, it is customary to support the mirrors on bearings which are slidably mounted on a fixed common shaft or shafts, the mirrors being mounted in series on the shaft or shafts, and stability of each mirror being ensured by the provision either of a very long support bearing, or of well-spaced front and rear bearings. In conventional photocopying apparatus, when this method of mounting moveable mirrors is employed, it has been necessary to provide a shaft or shafts having a length at least equal to the maximum length of a document to be copied plus the lengths of, or between, the bearings of each mirror. In other words, it has been necessary for the guide shaft or shafts to be made long, which hinders the provision of a compact photocopying apparatus.

It is accordingly an object of the present invention to provide an improved photocopying apparatus.

It is another object of the invention to provide a photocopying apparatus wherein a mirror guide shaft of shafts may be short, whereby a more compact photocopying apparatus may be obtained.

It is a further object of the invention to provide a photocopying apparatus having a mirror drive means, which is simple and avoids jolting of the mirrors.

In order to accomplish these and other objects, the inventors noted that a second mirror is moved at half the speed of a first mirror, and there is provided, according to the present invention, a photocopying apparatus wherein first and second mirrors are each supported in front and rear bearings slidably mounted on common shafts, the front and rear bearings of the second mirror, and the distance between the second mirror front and rear bearings being equal to the sum of the distance between the first mirror front and rear bearings and half the distance over which the front and rear bearings and half the distance over which the first mirror is required to be moved in order to scan the entirety of a document to be copied, whereby shorter guide shafts may be used and a more compact apparatus may be obtained. In the apparatus of the invention, drive of the first mirror also effects drive of the second mirror, and initial drive to the first mirror is not applied sharply, thus avoiding unrequired shaking or oscillation of the first and second mirrors.

Figure 2:
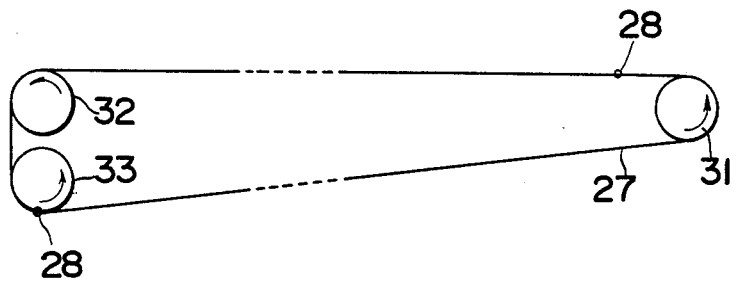
Figure 3:
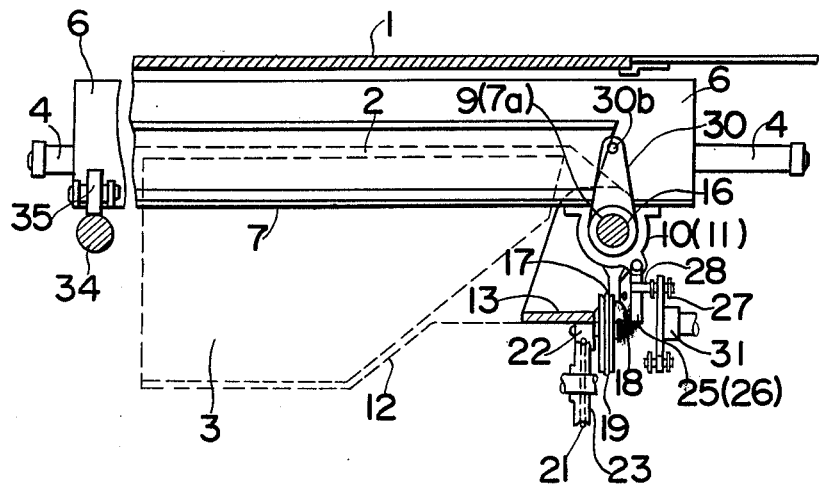
Figure 4:
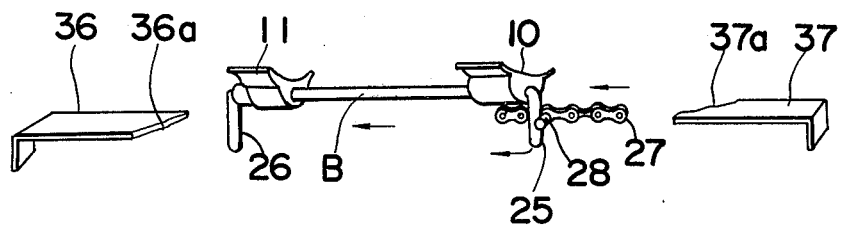
Figure 5:
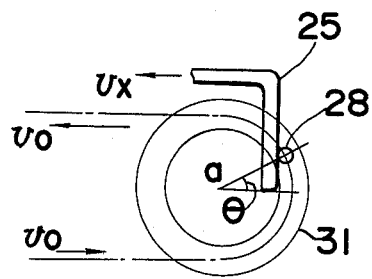

These and other objects and features of the present invention will become apparent from the following description taken in conjunction with preferred embodiments thereof with reference to the accompanying drawings, in which;

FIG. 1 is a schematic cross-sectional view of a photocopying apparatus according to one embodiment of the present invention, FIG. 2 is a schematic representation of a mirror assembly drive means, FIG. 3 is a cross-sectional view taken through the line III—III of FIG. 1, FIG. 4 is a perspective view explanatory of the action of parts of the apparatus of FIG. 1, and FIG. 5 is an explanatory drawing showing initial contact of a pin and rod.

Before the description of the present invention proceeds, it is to be noted that like parts are designated by like reference numerals throughout the accompanying drawings.

Referring initially to FIG. 1, there is shown a photocopying apparatus comprising a main frame 20 including front and rear walls 20a, 20b and a horizontal rest 1. A document to be copied is placed on the rest 1, where it remains stationary, and successive portions thereof are viewed through a moveable shutter 6a, slit, or similar means, which is provided on a lamp housing 6 below the document rest 1. The lamp housing 6 is movable parallel to the document rest 1, in a manner described below, and carries a mirror 2 which is inclined at 45° to the document rest 1, a lamp 4, and a reflector 5. When the lamp housing 6 is moved, light emitted by the lamp 4 is directed by the reflector 5 onto successive portions of a document on the document rest 1 through shutter 6a. Image rays from these successive portions fall onto the inclined mirror 2, and are directed thereby onto a vertical mirror 3, which is moved horizontally in the same direction as the inclined mirror 2 and at half the speed thereof, in a manner described below, and which directs the images to a focusing means and, then onto photosensitive material, not shown, in a known manner, the path of image rays being as indicated by a single dashed line in FIG. 1. The housing 6 containing the mirror 2 and lamp 4 assembly is fixedly mounted on an upper portion of a movable base 7.

In FIGS. 1 and 3, one side of the base 7 is supported in front and rear bearings 8, 9, which are slidably mounted on a first shaft 16. There is provided a bracket 7a of cylindrical shape under one side of the base 7, the first shaft 16 being loosely passed through the bracket 7a and front and rear bearings 8, 9 being mounted on both ends of the bracket 7a. Runners 35, which may roll along a second shaft 34, are mounted on the other side of the base 7. The first and second shafts 16, 34 are horizontal, on a level and parallel with one another, and extend in a front to rear alignment with respect to the copying apparatus, and adjacent to opposite sides thereof, opposite ends of the shafts 16, 34 being fixedly mounted in front and rear walls 20a, 20b of the main frame 20. The shafts 16, 34 being horizontal, the base 7, and hence mirror 2 and lamp 4, may be moved forwards or rearwards (leftwards or rightwards, respectively, in FIG. 1) parallel to the document support 1. A bumper arm 30, comprising a vertical portion 30a and an upper, rearwardly extending portion 30b is mounted on the upper side of the base 7, near the rear end thereof. When the base 7 of the mirror and lamp is drawn back to a rearmost position, in a manner described below, the bumper arm 30 comes into contact with a bumper block 29 of resilient material, which is mounted on the rear wall 20b of the main frame 20, whereby the mirror 2 and lamp 4 are stopped gently, and shock thereto is avoided. Bearing brackets 10,11, in which are mounted rods 25, 26 (described below), respectively, are affixed to the lower portion 7b of the base 7, at the side thereof nearer to the first shaft 16.

Still referring to FIGS. 1 and 3, the second mirror 3 is held in a vertical alignment by a movable frame 12. One end of a horizontal arm 13 is connected to one side of a lower portion of the frame 12, below the level of the shaft 16. The arm 13 extends forwards, at right-angles to the frame 12, and the front end thereof forms a short section 13a, which extends vertically upwards, to slightly above the level of the shaft 16, the shaft 16 passing slidably through an opening 13b formed in the vertical section 13a. The second mirror frame 12 is supported, and may be slid along the first shaft 16 by means of front and rear bearings 14, 15, which are slidably mounted on the shaft 16, and are in fixed attachment to the arm vertical section 13a and frame 12, respectively. The other side of the frame 12 and vertical section 13a are supported by runners (not shown) on the second shaft 34, the runners rolling along the second shaft 34, whereby the frame 12 and second mirror 3 may be moved forwards or rearwards along shafts 16, 34 in a horizontal line, as described below. As shown most clearly in FIG. 1, the first mirror bearings 8, 9 lie between the second mirror bearings 14, 15, i.e., the bearing 14 is forward of the bearing 8, and the bearing 15 is to the rear of the bearing 9 on the shaft 16. The distance between the second mirror bearings 14, 15 is made at least equal to the distance between the first mirror bearings 8,9 plus half the length of the maximum size document that can be copied by the apparatus, i.e., the distance over which the first mirror is required to be moved in order to scan the entirety of a document to be copied. Support means of the runners on the second shaft 34 at the other sides of the first and second mirrors are provided in the same relationships as the bearings 8, 9, 14 and 15 in a manner not to disturb and assist in the movement of the bearings. The minimum length of the shafts 16, 34 is made equal to the sum of the length of the maximum size document copiable by the apparatus, the distance between the first mirror bearings 8, 9, and the lengths of the actual bearings 14, 15. It is to be noted that the abovedescribed arrangement is particularly advantageous, and permits a more compact photocopying apparatus, since the shafts 16, 34 need not be as long as guide shafts in a conventional apparatus.

As indicated most clearly in FIG. 1, near the rear end of the arm 13 (extending from the second mirror frame 12) there is provided an integrally or fixedly attached vertical plate 22, on which a pulley 19 carrying a cable line 17 is rotatably mounted. One end 17a of the cable line 17 is fixedly attached to a lug 18 which is fixedly attached to, and extends downwards from the front bearing bracket 11 affixed to the first mirror base 7. The cable line 17 is led rearwards from the lug 18, around the pulley 19, and then forwards, the other end thereof 17b being fixedly attached to a front wall portion 20a of the main frame 20. A pulley 23 carrying a cable line 21 is rotatably mounted on a support arm 23a which is affixed to a lower portion of the rear wall 20b of the main frame 20. One end 21a of the cable line 21 is fixedly attached to the plate 22 on the arm 13, and the other end thereof 21b is in fixed or integral attachment to one end of a compression spring 24, the other end 24b of which is fixedly attached to the main frame front wall 20a. By this arrangement of pulleys 19, 23 and cable lines 17, 21, when the first mirror 2 and lamp 4 on the base 7 are moved forwards by a driving means in a manner described below, the second mirror 3 in the frame 12 is also moved forwards at half the speed of the base 7, as is evident from the relationship of the pulley 19 and cable line 17. The spring 24 on the cable line 21 exerts a force to subsequently return the base 7 and frame 12 to initial positions through the pulley 23. Forward drive to the first mirror and lamp base 7 is supplied by a chain 27 acting on the abovementioned rods 25, 26 in the bearing brackets 10, 11 attached to the base 7.

The chain 27 carries a fixedly attached pin 28 and is driven by sprocket wheels 31, 32, 33 (FIG. 2). The sprocket wheel 31 is rotatably mounted in a rear portion of the photocopying apparatus and the sprocket wheels 32, 33 are mounted in a front portion of the apparatus, the sprocket wheel being generally level with the sprocket wheel 31 and above the sprocket wheel 33. As shown most clearly in FIG. 3, the pin 28 attached to the chain 27 extends horizontally therefrom, whereby, when the sprocket wheels 31, 32 and 33 are rotated, by conventional means such as a motor, gear and the like (not shown), and the chain 27 is driven, the pin 28 is brought into contact with, and pushes the rear rod 25.

Reference is now had to FIGS. 4 and 5, which illustrate schematically the action of forward drive of the first mirror assembly, and hence of the second mirror assembly. In FIG. 4, the rods 25,26 are constituted by downwardly bent, integral end portions of a bar B which extends through holes formed in the brackets 10, 11, and may not move forwards or rearwards with respect to the bracket 10, 11. The bar B may be turned in the openings in the brackets 10, 11 but fits loosely therein, so that once turned to a particular position, the bar B automatically returns to a position in which the rods 25, 26 align in vertical states by means of their weight unless forcibly turned again. At the start of a photocopying process, when the base 7 and means 2 and 6 supported thereby are in a rearmost position, the rods 25, 26 extend approximately vertically downwards. When the chain 27 is rotated, the pin 28 contacts the rod 25, and, acting, therethrough, pushes the base 7, and first mirror 2 and other means contained in the housing 6, forwards, parallel to a document D, while at the same time the second mirror 3 is drawn forwards at half the speed of the first mirror 2, as described earlier, and the image of the document D is directed to and formed on a photosensitive material in a conventionally known manner. When the first and second mirrors 2, 3 have been moved forward a sufficient distance to permit scanning of the entirety of the document D, the front rod 26 is brought into contact with the bevel edge 36a of a plate 36 which is fixedly mouted in a forward part of the photocopying apparatus. As the base 7 continues to be moved forwards by the pin 28 on the chain 27, the rod 26 rides on the bevel edge 36a, and is pushed thereby away from the chain 27, thus causing the bar B to turn and the integrally attached rod 25 to move away from the chain 27 and out of contact with the pin 28. Forward drive to the base 7 therefore ceases, and the pin 28 is carried by the chain 27 past the rear rod 25, and also past the front rod 26, since, as noted earlier, the bar B remains turned in a particular position in which the rods 25, a. align aproximately in horizontal states as far as forcibly moved by means of the plate 36. The chain 27 subsequently carries the pin 28 around the sprocket wheels 32, 33 (FIG. 3), and to the sprocket wheel 31, to a position in which the pin 28 may again contact the rear rod 25. At the same time, the spring 24, acting through the cable line 21, pulley 23, and plate 22 (FIG. 1) draws the first and second mirror assemblies back to rearmost positions, in readiness for producing another photocopy, stopping of the rearward movement of the first and second mirror assemblies being effected gradually by contact of the abovementioned bumper arm 30 against the bumper block 29 (FIG. 1).

In FIG. 4, when the base 7 approaches the rearmost position, the rear rod 25 is brought into contact with the bevel edge 37a of a plate 37, which is fixedly attached to a rear portion of the photocopying apparatus. The bevel edge 37a is inclined oppositely to the bevel edge 36a of the forward plate 36, and as the base 7 continues to be moved rearwards by the force of the spring 24, the rod 25 rides on the bevel edge 37a and is pushed towards the chain 27, whereby the bar B is again turned to bring the rods 25, 26 into a generally vertical alignment, i.e., the rod 25 is again ready to be contacted by the pin 28 on the chain 27.

With reference to FIG. 5, when the base 7 is in a rearmost position, the rod 25 is adjacent to the sprocket wheel 31, and is initially contacted by the pin 28, when the pin 28 is level with the rotatory center of the sprocket wheel 31, i.e., at the point where the pin 28 begins to be carried forwards and upwards around the sprocket wheel 31. This ensures that there is no jolting of the first and second mirror assemblies, that is, of the rod 25 and pin 28 when drive is initially supplied to the pin 28 by the sprocket wheels 31. This may be seen to be so from a consideration of FIG. 5, in which $V_o$ represents the speed of the chain 27, and $a$ represents the radius of the sprocket wheel 31, and noting that when the pin 28 is level with the center of the sprocket wheel 31, the horizontal component of the pin 28 velocity is zero. The horizontal velocity of the rod 25 (and hence of the first mirror assembly) is, of course, equal to the horizontal component $V_x$ of the pin 28 velocity, and at any given moment, while the pin 28 is travelling around the sprocket 31, $V_x = \sin(V_o \cdot t/a)$, and horizontal acceleration $(dV_x/dt)$ max. $= V_o^2/a$. In other words, the acceleration applied to the first and second mirror assemblies is extremely slight, and the mirror assemblies are brought smoothly to the required speeds.

As is clear from the above description, the present invention provides a photocopying apparatus which is compact since only short guide shafts for moveable mirror assemblies are required, and wherein mirror assemblies are moved and halted smoothly by simple drive means.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. An image scanning device for directing images of successive portions of an original document onto a moving photosensitive material in a photocopying apparatus comprising a first mirror assembly supporting member, a second mirror assembly supporting member, a plurality of bearing members, at least one shaft, said first and second mirror assembly supporting members being individually supported by respective bearing members on said at least one shaft, and moved in the same direction parallel to said document, said second mirror assembly supporting member being moved at a half speed of said first mirror assembly supporting member, whereby the length of the optical path from said document to said photosensitive material is maintained constant during scanning of said original document, said bearing members of the first mirror assembly supporting member positioned between said bearing members of the second mirror assembly supporting member on said at least one shaft, and the distance between said bearing members of the second mirror assembly supporting member being at least equal to the sum of the distance between said bearing members of the first mirror assembly supporting member and a half of a movable distance of said first mirror assembly supporting member.

2. An image scanning device in a photocopying apparatus as defined in claim 1 further comprising a cable line connecting said first mirror assembly supporting member to the second mirror assembly supporting member, one end of said cable being fixedly attached to the first mirror assembly supporting member, and a pulley rotatably provided on the second mirror assembly supporting member, said cable line being led around the pulley and the other end thereof being fixedly attached to a certain position, said first mirror assembly supporting member having a first engage member, and a chain having a second engage member and adapted to be driven parallel to said document, said first engage member contacting said second engage member.

3. An image scanning device in a photocopying apparatus as defined in claim 2 further comprising sprocket wheels about which said chain travels and said first engage member being adapted to contact the second engage member when the second engage member travels around one of said sprocket wheels, whereby the first mirror assembly supporting member is driven by the chain through the medium of the first and second engage members.

4. An image scanning device in a photocopying apparatus as defined in claim 3 wherein said first engage member is movably mounted on the first mirror assembly supporting member and moves by contact with an actuating member mounted at a certain position in said device for disengaging said engage members.

5. An image scanning device in a photocopying apparatus as defined in claim 4 further comprising spring means coupled to said second mirror assembly supporting member, said spring means pulling said second mirror assembly supporting member for returning the mirror assembly supporting members to initial positions when the contact between said engage members is released.

* * * * *

UNITED STATES PATENT AND TRADEMARK OFFICE
CERTIFICATE OF CORRECTION

PATENT NO. : 3,877,807
DATED : April 15, 1975
INVENTOR(S) : TAKAJI KURITA

It is certified that error appears in the above—identified patent and that said Letters Patent are hereby corrected as shown below:

In the Foreign Application Priority Data on the first page:

"1974" should be -- 1973 --;

"49-45977" should be -- 48-45977 --.

Signed and Sealed this tenth Day of February 1976

[SEAL]

Attest:

RUTH C. MASON
Attesting Officer

C. MARSHALL DANN
Commissioner of Patents and Trademarks